(12) United States Patent
Balasubramanian et al.

(10) Patent No.: US 11,880,658 B2
(45) Date of Patent: Jan. 23, 2024

(54) METHOD AND SYSTEM FOR IMPLEMENTING A NATURAL LANGUAGE INTERFACE TO DATA STORES USING DEEP LEARNING

(71) Applicant: JPMorgan Chase Bank, N.A., New York, NY (US)

(72) Inventors: Chandrasekaran Balasubramanian, Hong Kong (HK); Krishnan P. Sankaran, Hong Kong (HK); Vishnu Chopra, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 280 days.

(21) Appl. No.: 16/829,271

(22) Filed: Mar. 25, 2020

(65) Prior Publication Data
US 2020/0311349 A1  Oct. 1, 2020

Related U.S. Application Data

(60) Provisional application No. 62/823,327, filed on Mar. 25, 2019.

(51) Int. Cl.
| | |
|---|---|
| *G06F 40/30* | (2020.01) |
| *G06N 3/08* | (2023.01) |
| *G06F 40/295* | (2020.01) |
| *G06F 40/205* | (2020.01) |

(Continued)

(52) U.S. Cl.
CPC ............ *G06F 40/30* (2020.01); *G06F 16/243* (2019.01); *G06F 16/2433* (2019.01); *G06F 40/205* (2020.01); *G06F 40/295* (2020.01); *G06N 3/044* (2023.01)

(58) Field of Classification Search
CPC .... G06F 40/211; G06F 40/253; G06F 40/268; G06F 40/284; G06F 40/30; G06N 20/00
See application file for complete search history.

(56) References Cited

U.S. PATENT DOCUMENTS

| | | | |
|---|---|---|---|
| 10,134,389 B2 * | 11/2018 | Hakkani-Tur | .......... G06F 40/30 |
| 10,395,654 B2 * | 8/2019 | Golipour | ................ G10L 15/22 |
| 10,629,186 B1 * | 4/2020 | Slifka | ................ G10L 15/1815 |

(Continued)

OTHER PUBLICATIONS

McCann et al., title={The natural language decathlon: Multitask learning as question answering}, 2018, journal={arXiv preprint arXiv: 1806.08730}, pp. 1-23 (Year: 2018).*

(Continued)

*Primary Examiner* — Lamont M Spooner
(74) *Attorney, Agent, or Firm* — GREENBLUM & BERNSTEIN, P.L.C.

(57) ABSTRACT

An embodiment of the present invention is directed to combining natural language processing with constrained grammar defined pattern matching to advantageously allow a system to translate natural language questions into any number of underlying technologies. By using a unique intermediate parse tree representation, the disclosed embodiments are able to instantiate a corresponding data store adapter for each given query, which may be for a relational database or a no-SQL database, for example. The ability to abstract underlying storage technology advantageously allows the management of disparate database systems, which is not possible using existing methods and technology.

20 Claims, 5 Drawing Sheets

(51) Int. Cl.
*G06F 16/242* (2019.01)
*G06N 3/044* (2023.01)

(56) References Cited

U.S. PATENT DOCUMENTS

| | | | |
|---|---|---|---|
| 10,776,579 B2 * | 9/2020 | Mishra | G06F 40/205 |
| 10,878,808 B1 * | 12/2020 | Mathias | G10L 15/22 |
| 10,943,583 B1 * | 3/2021 | Gandhe | G10L 15/183 |
| 10,958,600 B1 * | 3/2021 | Annadata | H04L 51/02 |
| 11,016,964 B1 * | 5/2021 | Hinegardner | G06F 16/2428 |
| 11,048,702 B1 * | 6/2021 | Kumar | G06F 16/3329 |
| 11,055,355 B1 * | 7/2021 | Monti | G06F 16/90332 |
| 11,093,714 B1 * | 8/2021 | Bhatia | G06N 3/044 |
| 2004/0117189 A1 | 6/2004 | Bennett | |
| 2013/0311166 A1 * | 11/2013 | Yanpolsky | G06F 16/243 704/2 |
| 2015/0039292 A1 | 2/2015 | Suleman et al. | |
| 2015/0081279 A1 | 3/2015 | Suleman et al. | |
| 2017/0177715 A1 * | 6/2017 | Chang | G06N 5/04 |
| 2017/0372199 A1 * | 12/2017 | Hakkani-Tur | G10L 15/22 |
| 2018/0052929 A1 | 2/2018 | Liu et al. | |
| 2018/0157638 A1 * | 6/2018 | Li | G10L 15/22 |
| 2019/0317994 A1 * | 10/2019 | Singh | G06F 40/30 |
| 2019/0362009 A1 * | 11/2019 | Miseldine | G06F 16/285 |
| 2020/0042642 A1 * | 2/2020 | Bakis | G06F 40/35 |
| 2020/0042649 A1 * | 2/2020 | Bakis | H04L 51/02 |
| 2020/0117740 A1 * | 4/2020 | Schmidt | G06F 16/9535 |
| 2020/0151392 A1 * | 5/2020 | Crabtree | G06N 5/022 |
| 2020/0160458 A1 * | 5/2020 | Bodin | G06F 8/33 |
| 2020/0279001 A1 * | 9/2020 | Prabhugaonkar | G06N 5/022 |
| 2020/0293564 A1 * | 9/2020 | Reh | G06N 3/045 |
| 2020/0410514 A1 * | 12/2020 | Livhits | G06Q 30/0269 |
| 2021/0082406 A1 * | 3/2021 | Kim | G10L 15/183 |
| 2021/0217416 A1 * | 7/2021 | Nadimpalli | G06N 5/04 |
| 2021/0319907 A1 * | 10/2021 | Harley | G16H 50/70 |

OTHER PUBLICATIONS

Lei et al., title={Ontology-Based Natural Language Query Interfaces for Data Exploration.}, 2018, journal={IEEE Data Eng. Bull.}, volume={41}, number={3}, pages={52--63}, (Year: 2018).*
Notification of Transmittal of the International Search Report and the Written Opinion of the International Searching in PCT/US20/24650 dated Jun. 19, 2020.

* cited by examiner

Natural Language Query what's the PNL for my clients over the age of 80?  — 505

Results

Clients

| Client SID | Age | Assets Under Management | PNL |
|---|---|---|---|
| Keyword search | Keywords | Show All | Show All |
| aafd1xxxxxxxx08f82 | 84 | 7##,###.562 | 5##,###.182 |
| e46c68axxxxxxxx5d8178782 | 87 | 1##,###.676 | 8#,###.216 |
| 1a0322xxxxxxxxxxb0feac9 | 82 | 3##,###.692 | 7#,###.952 |
| 2bca4cxxxxxxxx1c602c8 | 93 | 3#,###.291 | 1#,###.651 |
| 26f4f39xxxxxxxx680dd4f | 83 | 2#,###.568 | 1#,###.08 |
| e94afc8xxxxxxxx5aae4f3f | 88 | 5,###.388 | 2,###.225 |
| 39b6f7bxxxxxxxxbb1b2b8 | 81 | 8,###.748 | 1,###.348 |
| a8f32fxxxxxxxx3d267 | 86 | 3#,###.134 | 6##.178 |
| 239xxxxxxxxc9f350a485 | 85 | 3#,###.267 | 3##.747 |
| cf28007xxxxxxxxxce923 | 88 | 0.00 | 0.00 |
| 97cacxxxxxxxf4691fd | 89 | 0.00 | 0.00 |
| 1e06b1xxxxxxxxxb8cb51 | 83 | 0.00 | 0.00 |

METHOD AND SYSTEM FOR IMPLEMENTING A NATURAL LANGUAGE INTERFACE TO DATA STORES USING DEEP LEARNING

CROSS REFERENCE TO RELATED APPLICATIONS

The application claims priority to U.S. Provisional Application 62/823,327, filed Mar. 25, 2019, the contents of which are incorporated herein in its entirety.

FIELD OF THE INVENTION

The present invention relates generally to providing non-technical users access and self-service to complex data, and more particularly to systems and methods for a natural language interface to data stores using deep learning.

BACKGROUND OF THE INVENTION

Modern businesses deal with large sets of complex data stored in databases accessible only through SQL or no-SQL management systems, or other kinds of management systems. Business users (for example, non-technical individuals at a business) may be able to benefit from access and analysis of the large sets of complex data available to the business, but such users are generally unable to access the data without intermediaries. This may be, for example, because a database is only accessible through system queries, and a business user may not know how to code or write, for example, SQL queries.

The opaqueness of big data is a current problem. A need therefore exists for scalable methods and systems to provide non-technical users access and self-service to data.

These and other drawbacks exist.

SUMMARY OF THE INVENTION

According to one embodiment, the invention relates to a computer implemented method that implements a natural language interface for big data analysis. The method comprises the steps of: receiving, via an input, a natural language inquiry; identifying a set of words associated with the natural language inquiry; generating, a vector space modeling engine, a vector representation of each word in the set of words in the natural language inquiry, wherein the vector representation comprises a plurality of word vectors; performing, via a sequence model processor, named entity recognition of each word in the vector representation; performing, via an intent classifier, intent recognition of the natural language inquiry based on the plurality of word vectors of the vector representation; generating an intermediate language form from the natural language inquiry based on the recognized entities and intent; and parsing, via a semantic parser, the intermediate language form into one or more database system queries.

According to another embodiment, the invention relates to a computer implemented system that implements a natural language interface for big data analysis. The system comprises: an input that receives a natural language inquiry; a computer processor that identifies a set of words associated with the natural language inquiry; a vector space modeling engine that generates a vector representation of each word in the set of words in the natural language inquiry, wherein the vector representation comprises a plurality of word vectors; a sequence model processor that performs named entity recognition of each word in the vector representation; and an intent classifier that performs intent recognition of the natural language inquiry based on the plurality of word vectors of the vector representation; wherein an intermediate language form is generated from the natural language inquiry based on the recognized entities and intent and the intermediate language form is parsed into one or more database system queries.

The system may be implemented as a specially programmed computer system comprising one or more computer processors, interactive interfaces, electronic storage devices, and networks. The computer implemented system and method described herein provide unique advantages to entities, organizations and other users, according to various embodiments of the invention. An embodiment of the present invention is directed to combining natural language processing with constrained grammar defined pattern matching to advantageously allow a system to translate natural language questions into any number of underlying technologies. By using a unique intermediate parse tree representation, the disclosed embodiments are able to instantiate a corresponding data store adapter for a given query, which may be for a relational database, a no-SQL database and/or other database or source of big data. The ability to abstract underlying storage technology advantageously allows the management of disparate database systems, which is not possible using existing methods and technology. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 5 is an exemplary illustration of a natural language inquiry, according to an exemplary embodiment of the invention.

DETAILED DESCRIPTION

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

Figure 1:
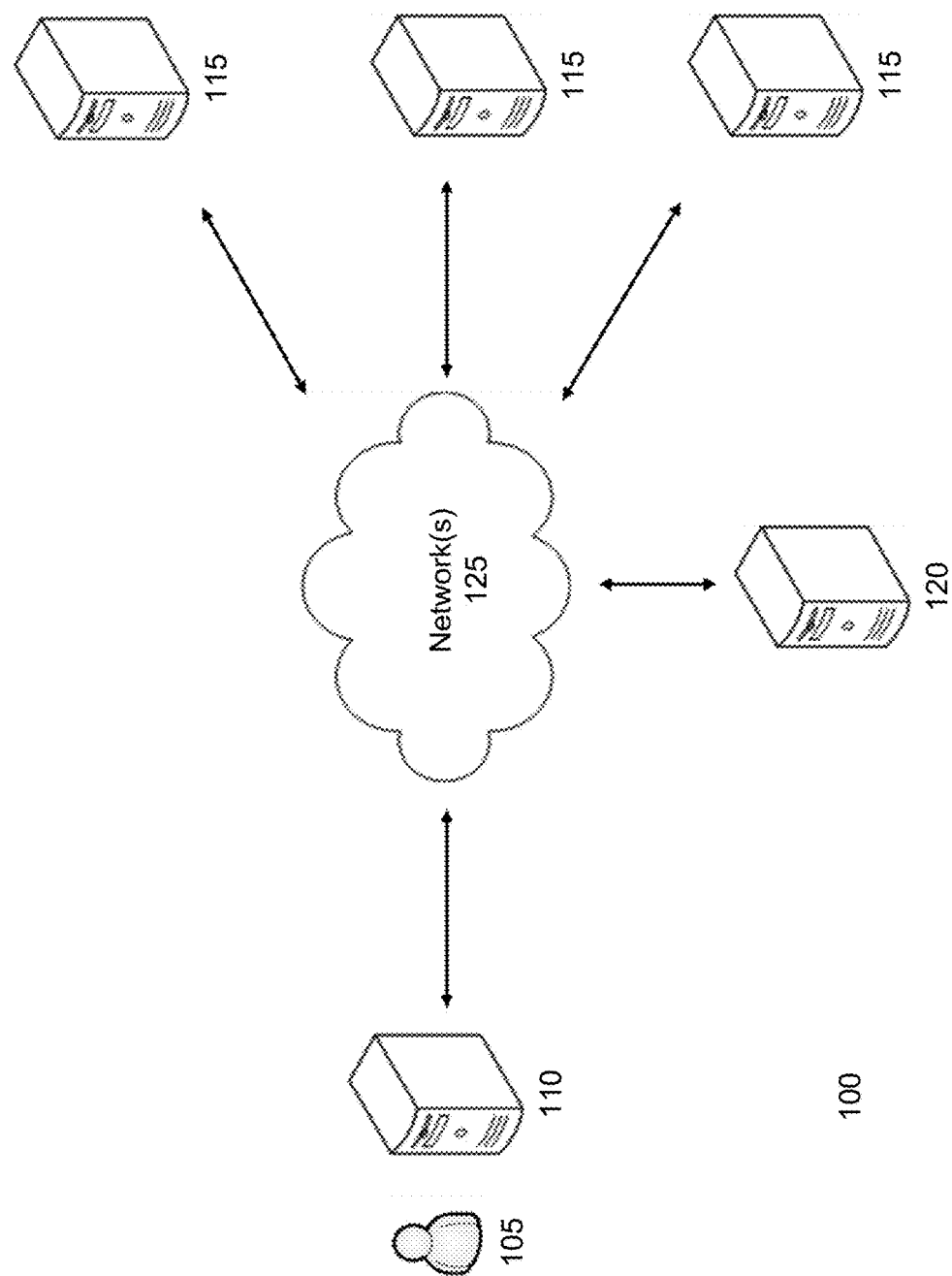
FIG. 1 is a diagram of a system for providing a natural language interface to data stores using deep learning, according to an exemplary embodiment of the invention.

FIG. 1 is a diagram of a system for providing a natural language interface to data stores using deep learning, according to an exemplary embodiment of the invention.

Figure 2:
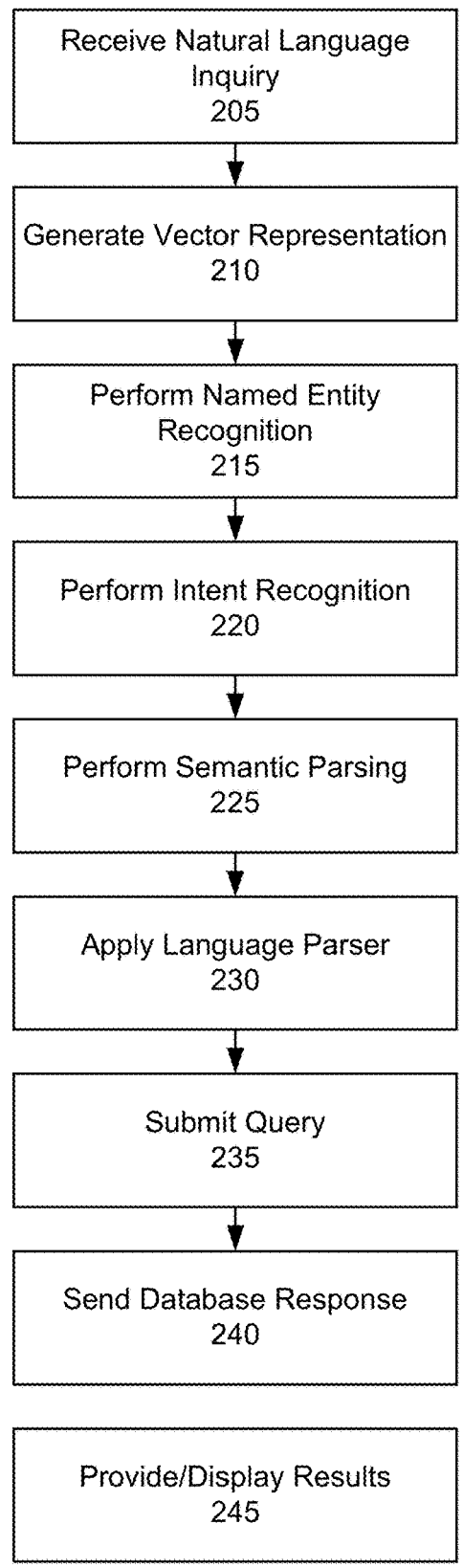
FIG. 2 is a diagram of a method for providing a natural language interface to data stores using deep learning, according to an exemplary embodiment of the invention.
Figure 3:
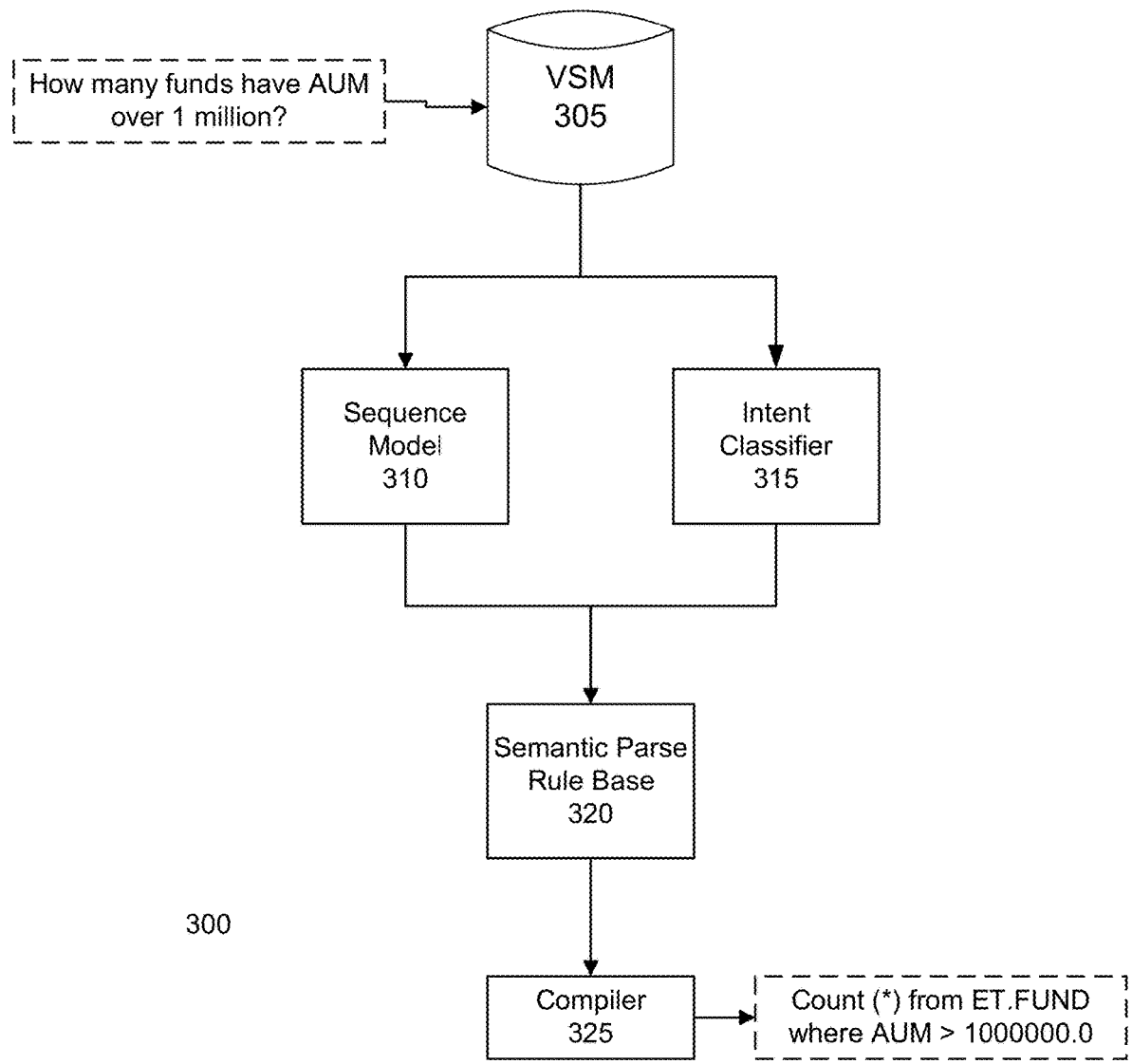
FIG. 3 is a diagram illustrating application logic for a natural language interface, according to an exemplary embodiment of the invention.

The system of FIG. 1 may be used, for example, to implement the exemplary method illustrated in FIG. 2 as well as the application logic illustrated in FIG. 3.

According to one embodiment, system 100 may include a plurality of computing devices, including user computing device 110 associated with user 105, interface computing device 120, and database computing devices 115. The system may also include one or more networks 125 that connect the various computing devices shown in FIG. 1. Although only one user computing device 110, three database computing devices 115, and one interface computing device 120 are shown in FIG. 1 to illustrate principles of the invention, in practice many such devices and servers will typically be involved in implementation of various embodiments of the invention. A user may have multiple user computing devices for example, or the interface computing device may comprise several computing devices.

Computing devices 110, 115, and 120 may be any suitable electronic device, including, for example, smartphones, smart watches, laptop computers, notebook computers, desktop computers, tablet computers, workstations, Internet of Things (IoT) appliances, etc.

The networks may comprise, for example, any one or more of the Internet, an intranet, a Local Area Network (LAN), a Wide Area Network (WAN), an Ethernet connection, a WiFi network, a Global System for Mobile Communication (GSM) link, a cellular phone network, a Global Positioning System (GPS) link, a satellite communications network, or other network, for example. The system may be operated by a business or other type of organization that operates and maintains data stored in databases.

According to one embodiment, system 100 may include one or more interface computing devices 120 that execute a computer program or application for a natural language interface to data stores using deep learning. In one embodiment, the interface computing device and the user computing device are the same.

The user may interface with the user computing device 110 to submit a natural language inquiry to the interface computing device 120, for example "How many funds have AUM over 1 million?" The natural language interface program may convert the natural language query into a system query such as "count (*) from ET.FUND where AUM>1000000.0." The natural language interface program may convert the natural language query, for example, using the method illustrated in FIG. 2 or the application logic illustrated in FIG. 3.

The natural language interface program may submit the system query to one or more database computing devices 115. The natural language interface program may then return an output received from the database back to the user computing device 110.

FIG. 2 is a diagram of a method for providing a natural language interface to data stores using deep learning according to an exemplary embodiment of the invention. In step 205, an interface computing device may receive a natural language inquiry from a user. In step 210, the interface computing device may generate vector representations of the natural language inquiry, e.g., a representation of the individual words as word vectors in a context space. In step 215, the interface computing device may apply a deep learning algorithm to perform named entity recognition. In step 220, the interface computing device may perform intent recognition. In step 225, the interface computing device may perform semantic parsing. In step 230, the interface computing device may use a language parser on the intermediate language form to extract relevant data fields and to generate a system query for a database according to a particular syntax. In step 235, the interface computing device may submit the system query to one or more databases. In step 240, the interface computing device may send the database response to a user computing device. In step 245, the user computing device may display the database response to a user. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed. Additional details for each step is provided below.

In step 205, an interface computing device may receive a natural language inquiry from a user. The natural language inquiry may include a request, question or phrase, such as "How many funds have AUM over 1 million." In this example, a user may want to know how many funds at the business have assets under management with a total market value in excess of one million dollars. This exemplary request may seek or expect a single number as an answer. As another example, the natural language inquiry may be represented as "What is the pnl of my clients who are over age 65?" In this example, a user may want to know the profit and loss of clients older than 65. This exemplary question may seek or expect a table of data as an answer. The user may know that such data is available to the business but not know how to access it through traditional system queries.

The natural language inquiry may be received in various formats, including text, voice, etc. The inquiry may be received from a user, system and/or other requesting entity.

In step 210, the interface computing device may generate vector representations of the natural language inquiry, e.g., a representation of the individual words as word vectors in a context space. According to an exemplary embodiment, the interface computing device may leverage an unsupervised learning algorithm for obtaining vector representations for words. For example, "GloVe" or "Global Vectors for Word Representation" may be applied. According to another example, the interface computing device may leverage a Word2Vec algorithm or another suitable unsupervised learning algorithm capable of extracting vector representations compatible with intent recognition. Other algorithms and techniques for generating vector representations may be implemented in accordance with the various embodiments of the present invention.

In step 215, the interface computing device may apply a deep learning algorithm to perform named entity recognition. In one embodiment, the interface computing device may leverage a bi-direction Long Short-Term Memory (LSTM) network model to identify the entities. Other neural network architectures, including artificial recurrent neural networks, may be applied. This process may extract keywords, entities, relational expressions, parameters, and values from a natural language question. In addition, the interface computing device may leverage various suitable deep learning machine learning models capable of entity recognition. For example, the interface computing device may use an attention algorithm on top of the neural network. Other implementations and variations may be supported.

In the example of the natural language inquiry "What is the pnl of my clients who are over age 65," the inquiry may be extracted as follows:

['what', 'is', 'the', 'pnl', 'of', 'my', 'clients', 'who', 'are', 'over', 'age', 'NUM', '0', '0', '0', '0', '0', '0', '0', '0', '0', '0']
[[1 1 1 5 1 1 4 1 1 2 5 1 1 1 1 1 1 1 1 1 1 1]]

In this illustration, the non 1 value may signify entities that are to be identified and tagged. Other variations and representations may be applied. For example, the named entity recognition may identify "pnl" and "age" as attributes. The named entity recognition may identify "Clients" as a main entity. The named entity recognition may identify "over" as an operator, e.g., a relational "greater than." And, the named entity recognition may identify "65" as a cardinal value.

In step 220, the interface computing device may perform intent recognition. The interface computing device may use the word vectors previously generated to identify intent. The interface computing device may, for example, leverage supervised machine learning to identify the correct intents based on the features.

For example, the interface computing device may identify a set of root intents, e.g., 5 five root intents. Root intents may include: selection (e.g., selecting a record from a database according to criteria), aggregation (e.g., "how many"-type questions), relationship (e.g., identifying a relation between entities), rank (e.g., "top, best, or lowest"-type questions), and function (e.g., specialized questions that uses hard-coded function names). Additional root intents, including sub intents, may be identified.

An example of a question with a "selection" intent may be "What is the pnl of my clients who are over age 65." An example of a question with an "aggregation" intent may be "How many funds have AUM over 1 million." An example of a question with a "relationship" intent may be "Which funds did John buy?" In this example, the relationship may be "John (client)→buys→Funds (products)," where "buy" is a type of relation. An example of a question with a "rank" intent may be "Which customers have the top five pnls." An example of a question with a "function" intent may be "what is the concentration of apple," wherein "concentration" is a hard-coded function name.

In step 225, the interface computing device may perform semantic parsing. The interface computing device may leverage the above information (from, for example, named entity recognition and intent recognition) to construct an intermediate language form that may then be parsed further.

In the example natural language inquiry "What is the pnl of my clients who are over age 65," the intermediate language form may be represented as:

(select {'P__ATTR': u'pnl', 'P__ENT': u'clients'})
(where [('P__ATTR', u'age'), ('XPR', u'over'), ('CD', u'65.0')])
{'XPR': {'P__ATTR': u'age', 'XPR': u'over', 'CD': u'65.0'}, 'SELECT': {'P__ATTR': u'pnl', 'P__ENT': u'clients'}}

In one embodiment, the intermediate form may be built such that patterns may be easily be parsed from the intermediate form to convert the data into different structure query syntaxes. The intermediate form may be, for example, in JSON or XML file format, or any other suitable representation that the underlying compiler may parse or understand. For example, the compiler may provide an output in a domain specific language.

In step 230, the interface computing device may use a language parser on the intermediate language form to extract relevant data fields and to generate a system query for a database according to a particular syntax. For example, based on the intermediate language form, the language parser may generate a domain specific language across multiple data sources.

In the example natural language inquiry "What is the pnl of my clients who are over age 65," the system query may be represented as: "show me PNL from CLIENT where AGE>65.0." The system query may be constructed into any syntax as necessary, for SQL databases, no-SQL databases, or otherwise.

In step 235, the interface computing device may submit the system query to one or more databases. The interface computing device may then receive a response. The response may include a table, a series of tables, a single number, an error message, or any other response as appropriate to the system query and to the one or more databases. Other outputs and formats may be realized.

In step 240, the interface computing device may send the database response to a user computing device.

In step 245, the user computing device may display the database response to a user. For example, the interface computing device and the user computing device are the same device, e.g., the application logic managing the natural language interface may be present on a user computing device. The application logic managing the natural language interface may alternatively be present on one or more remote servers, or split between remote servers and a user computing device.

In one embodiment, the one or more databases are SQL databases. In another embodiment, the one or more databases are no-SQL databases. Other databases, data stores and variations may be supported.

FIG. 3 is a diagram illustrating application logic for a natural language interface, according to an exemplary embodiment of the invention. FIG. 3 illustrates interactions between various components in a system. As shown in FIG. 3, VSM (Vector Space Modeling) 306 receives an input 302 and communicates with Sequence Model 310 and Intent Classifier 315. The outputs are then received by Semantic Parse Rule Base 320 and then forwarded to Compiler 325. The components illustrated in FIG. 3 are exemplary only, other variations may be supported in accordance with the embodiments of the present invention.

For example, input 302 may represent a natural language inquiry, such as "How many funds have AUM over 1 million?" Other requests and/or questions may be received. Requests may be received by a user as well as a system in batch form or other electronic input.

VSM 305 represents vector space modeling that achieves domain-specific word embedding. VSM 305 may generate vector space representations of words in the natural language inquiry.

Sequence Model 310 may perform sequence modelling on the vector space representations. For example, the application may be trained with deep sequential neural nets on domain specific data, which may be scalable across domains, e.g., the application may perform a domain-specific algorithm where the framework itself may be expanded to other domains. The application may extract keywords, entities, parameters, and/or values from the question.

Intent Classifier 315 may perform intent classification based on the vector space representations. The application may determine the type of query that is being requested by identifying the necessary sub-queries, operations, and functions.

Semantic Parse Rule Base 320 may perform semantic parsing based on the outputs of Sequence Model 310 and Intent Classifier 315. For example, the application may assemble extracted entities into an intermediate logical form which may be passed down to a compiler.

Compiler 326 may compile the intermediate form into a system query for a database. Using the example from earlier, the system query may be, for example, "Count (*) from ET.FUND where AUM>1000000.0"—as shown by 330. Compiler 326 may accordingly provide a query in a domain specific language. According to an embodiment of the present invention, Compiler 326 may generate queries for various databases in various query formats. Accordingly, an embodiment of the present invention may translate queries into any number of underlying technologies via the intermediate form.

Figure 4:
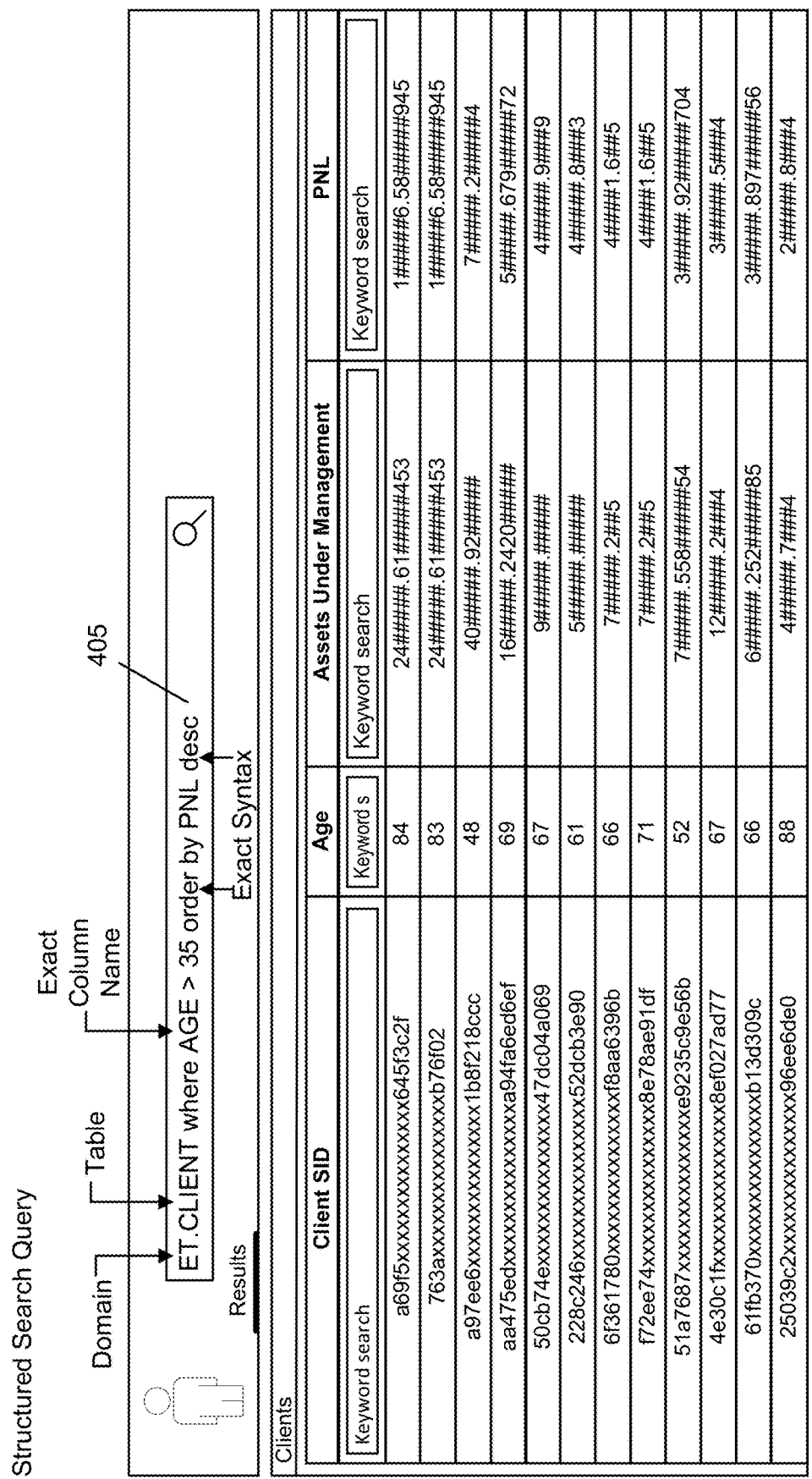
FIG. 4 is an exemplary illustration of a structured search query.

FIG. 4 is an exemplary illustration of a structured search query. The structured query in FIG. 4 may be, for example, for a search without using a natural language interface. As illustrated in FIG. 4, the structured query 405 may be entered into an interface 400. Exemplary results of the structured query (410) may be provided. Unlike with a natural language interface, the structured query must use an exact syntax, including an exact domain name ("ET"), table name ("CLIENT"), and column name ("AGE").

FIG. 5 is an exemplary illustration of a natural language inquiry, according to an exemplary embodiment of the invention. The natural language inquiry in FIG. 5 may be, for example, for a search using a natural language interface, for example according to the embodiments described in FIGS. 1-3 above.

As illustrated in FIG. 5, the natural language inquiry 505 may be entered into an interface 500. Exemplary results of the natural language inquiry 510 may be provided. Unlike in the structured query illustrated in FIG. 4, the natural language inquiry is written in natural language, as "what's the PNL for my clients over the age of 80?"

The approach described above of combining natural language processing with constrained grammar defined pattern matching can advantageously allow a system to translate natural language questions into any number of underlying technologies. By using a unique intermediate parse tree representation, the disclosed embodiments are able to instantiate a corresponding data store adapter for each given query, which may be for a relational database or a no-SQL database.

The ability to abstract underlying storage technology advantageously allows the management of disparate database systems, which is not possible using existing methods and technology.

Those skilled in the art will appreciate that the system diagrams discussed above are merely examples of a natural language interface system configuration and are not intended to be limiting. Other types and configurations of networks, servers, databases, mobile devices, and personal computing devices (for example, desktop computers, tablet computers, mobile computing devices, smart phones, etc.) may be used with exemplary embodiments of the invention. Although the foregoing examples show the various embodiments of the invention in one physical configuration; it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. The components of the various embodiments may be arranged at any location or locations within a distributed network without affecting the operation of the respective system.

Data and information maintained by the servers and computing devices shown in FIG. 1 may be stored and cataloged in one or more databases, which may comprise or interface with a searchable database and/or a cloud database. The databases may comprise, include or interface to a relational database. Other databases, such as a query format database, a Standard Query Language (SQL) format database, a storage area network (SAN), or another similar data storage device, query format, platform or resource may be used. The databases may comprise a single database or a collection of databases. In some embodiments, the databases may comprise a file management system, program or application for storing and maintaining data and information used or generated by the various features and functions of the systems and methods described herein.

The communications networks in FIG. 1, may be comprised of, or may interface to any one or more of, for example, the Internet, an intranet, a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, an Asynchronous Transfer Mode (ATM) connection, a Fiber Distributed Data Interface (FDDI) connection, a Copper Distributed Data Interface (CDDI) connection, or an optical/DWDM network.

The communications networks in FIG. 1 may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Bluetooth radio link, or an IEEE 802.11-based radio frequency link. The communications network may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, the communication network may comprise a satellite communications network, such as a direct broadcast communication system (DBS) having the requisite number of dishes, satellites and transmitter/receiver boxes, for example. The communications network may also comprise a telephone communications network, such as the Public Switched Telephone Network (PSTN). In another embodiment, the communication network may comprise a Personal Branch Exchange (PBX), which may further connect to the PSTN.

Exemplary embodiments of the invention may utilize other types of communication devices whereby a user may interact with a network that transmits and delivers data and information used by the various systems and methods described herein. The computing devices may include a microprocessor, a microcontroller or other device operating under programmed control. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art. The computing devices may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The computing devices may also include a network-enabled appliance or another TCP/IP client or other device. The computing devices may include various connections such as a cell phone connection, WiFi connection, Bluetooth connection, satellite network connection, and/or near field communication (NFC) connection, for example.

As described above, FIG. 1 includes a number of computing devices, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software, firmware, hardware, or a combination of the foregoing.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The computing devices in FIG. 1 may include software or computer programs stored in the memory (for example, non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, e.g., to a particular type of computer, for example. Any suitable programming language may be used in accordance with the various embodiments of the invention. For example, the programming language used may include assembly language, Ada, APL, Basic, C, C++, dBase, Forth, HTML, Android, iOS, .NET, Python, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A computer implemented method that implements a natural language interface for big data analysis, the method comprising:

receiving, via an input, a natural language inquiry;

identifying a set of words associated with the natural language inquiry;
generating, via a vector space modeling engine, a vector representation of each word in the set of words in the natural language inquiry, wherein the vector representation comprises a plurality of global vectors;
utilizing a domain-specific algorithm to perform, via a sequence model processor, named entity recognition of each word in the vector representation by using an attention algorithm on top of a recurrent neural network model that has been trained with deep sequential neural networks on domain specific data that is scalable across domains, to identify one or more entities, wherein the deep sequential neural networks comprise a framework that expands to other domains;
performing, via an intent classifier, intent recognition of the natural language inquiry based on the plurality of global vectors of the vector representation, wherein the intent recognition includes selection, aggregation, relationship, rank and function;
generating an intermediate language form from the natural language inquiry based on the recognized entities and intent;
parsing, via a semantic parser, the intermediate language form into one or more database system inquiries, wherein the one or more database system queries include at least one no-SQL database system query;
utilizing the parsed intermediate language form to generate a unique intermediate parse tree representation of the recognized entities and intent;
instantiating a data store adapter by utilizing the unique intermediate parse tree representation of the recognized entities and intent; and
transmitting, to at least one from among a plurality of disparate databases, a domain specific query for the recognized entities and intent.

2. The method of claim 1, wherein the one or more database system queries include at least one SQL database system query.

3. The method of claim 1, wherein the performing named entity recognition and performing intent recognition are executed in parallel.

4. The method of claim 1, wherein the named entity recognition is performed using deep learning.

5. The method of claim 1, wherein performing named entity recognition comprises extracting one or more of keywords, entities, relational expressions, parameters and values from the natural language inquiry.

6. The method of claim 1, wherein the intermediate language form is received by a compiler that generates an output in a domain specific language.

7. The method of claim 1, wherein the intermediate language form is pattern matched to generate one or more system queries.

8. The method of claim 1, wherein the named entity recognition is performed using deep learning.

9. The method of claim 1, further comprising:
receiving, from the at least one from among the plurality of disparate databases, by the natural language interface, a response to the domain specific query.

10. The method of claim 9, further comprising: providing, by the natural language interface, the response to a user.

11. The method of claim 1, wherein the response comprises at least one from among: a table and an error message.

12. A computer implemented system that implements a natural language interface for big data analysis, the system comprising:
an input that receives a natural language inquiry;
a computer processor that identifies a set of words associated with the natural language inquiry;
a vector space modeling engine that generates a vector representation of each word in the set of words in the natural language inquiry, wherein the vector representation comprises a plurality of global vectors;
a sequence model processor that utilizes a domain-specific algorithm to perform named entity recognition of each word in the vector representation by using an attention algorithm on top of a recurrent neural network model, that has been trained with deep sequential neural networks on domain specific data that is scalable across domains, to identify one or more entities, wherein the deep sequential neural networks comprise a framework that expands to other domains; and
an intent classifier that performs intent recognition of the natural language inquiry based on the plurality of global vectors of the vector representation, wherein the intent recognition comprises selection, aggregation, relationship, rank and function,
wherein an intermediate language form is generated from the natural language inquiry based on the recognized entities and intent,
wherein the intermediate language form is parsed into one or more database system inquiries, wherein the one or more database system queries comprise at least one no-SQL database system query,
wherein the parsed intermediate language form is utilized to generate a unique intermediate parse tree representation of the recognized entities and intent,
wherein a data store adapter is instantiated by utilizing the unique intermediate parse tree representation of the recognized entities and intent, and
wherein a domain specific query for the recognized entities and intent, is transmitted to at least one from among a plurality of disparate databases.

13. The system of claim 12, wherein the one or more database system queries include at least one SQL database system query.

14. The system of claim 12, wherein the performing named entity recognition and the performing intent recognition are executed in parallel.

15. The system of claim 12, wherein performing named entity recognition comprises extracting one or more of keywords, entities, relational expressions, parameters and values from the natural language inquiry.

16. The system of claim 12, wherein the intermediate language form is received by a compiler that generates an output in a domain specific language.

17. The system of claim 12, wherein the intermediate language form is pattern matched to generate one or more system queries.

18. The system of claim 12, wherein the system receives, from the at least one from among the plurality of disparate databases, a response to the domain specific query.

19. The system of claim 18, wherein the system provides the response to a user.

20. The system of claim 18, wherein the response comprises at least one from among: a table and an error message.

* * * * *